Aug. 2, 1960

F. P. BUNDY 2,947,611

DIAMOND SYNTHESIS

Filed Jan. 6, 1958

Inventor
Francis P Bundy
by Paul A. Frank
His Attorney

United States Patent Office 2,947,611
Patented Aug. 2, 1960

2,947,611

DIAMOND SYNTHESIS

Francis P. Bundy, Alplaus, N.Y., assignor to General Electric Company, a corporation of New York Filed Jan. 6, 1958, Ser. No. 707,436

4 Claims. (Cl. 23—209.1)

This application is a continuation-in-part of my co-pending application, Serial No. 655,884, filed April 29, 1957, and now abandoned, and assigned to the same assignee as the present invention.

This invention relates to a method of converting carbonaceous materials to diamond. More particularly, this invention relates to the synthesis of diamonds employing platinum as a catalyst.

In the past a great deal of effort has been expended in attempts to convert carbonaceous materials into diamond. The need for a readily available source of diamond has arisen because of its increased usage and the very few known sources of diamond in the world at present.

An object of the present invention is to provide a method for the transformation of carbonaceous material into diamond.

A further object of the present invention is to provide a method for the conversion of carbonaceous materials into diamond under the action of extremes of heat and pressure in the presence of platinum.

These and other objects of my invention are accomplished by subjecting carbonaceous materials to a pressure of at least 90,000 atmospheres at a temperature of from 2050° C. to 2500° C. in the presence of platinum.

My invention may be best understood by reference to the following detailed description in combination with the drawings in which.

Figure 1:
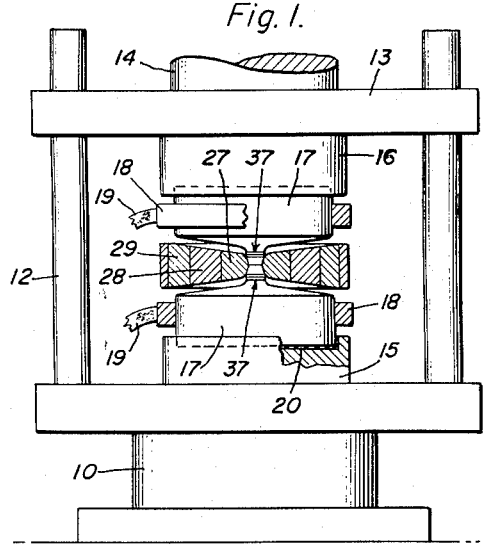
Fig. 1 is a front elevational view, partly in section, of a hydraulic press with a high temperature high pressure apparatus which may be employed in practicing my invention.

In the copending applications of H. T. Hall et al., Serial No. 633,505, filed January 10, 1957, and now abandoned, and Serial No. 707,435, filed concurrently herewith, both assigned to the same assignee as the present invention, there is described and claimed a method of making diamonds employing a particular group of catalysts at elevated pressures and with operating temperatures of from 1200–2000° C.

Although the method of making diamonds described in the aforementioned Hall et al. applications is quite satisfactory, the method is not applicable to the conversion of carbonaceous materials to diamond in the presence of platinum. This Hall et al. method is unsatisfactory when using platinum as a catalyst since the minimum temperature at which platinum is effective as a catalyst is above the maximum temperature described in the aforementioned Hall et al. application. The fact that the minimum temperature at which platinum is satisfactory as a catalyst is greater than the maximum described in the Hall et al. application is completely unexpected and is not predictable from a knowledge of the art.

With platinum as a catalyst and with a pressure of at least 90,000 atmospheres and temperatures of from 2050° to 2500° C., there is an almost unlimited variety of carbonaceous materials which may be converted to diamond.

For purposes of illustrating my invention, detailed examples of the conversion of graphite to diamond will be set forth below, principally because graphite is the preferred and most convenient starting material for diamond synthesis. However, it should be understood that carbonaceous materials other than graphite are convertible to diamond. Thus, the process of the present invention is applicable to amorphous carbon, coal, coke, charcoal, etc. In addition, the process of the present invention is applicable to materials which contain chemically bound carbon. This type of material includes carbon-containing organic and inorganic compounds of known structure and composition as well as organic materials of indeterminate specific composition. Illustrative examples of carbonaceous materials of various types that are operative in my invention and containing chemically bound carbon include such unrelated material as coal tar pitch, wood, paper, lithium carbide, naphthalene, etc. Even though the process of my invention is applicable to the conversion of chemically combined carbon to diamond, it is not assumed that chemically combined carbon is converted directly to diamond. Although I do not wish to be bound by theory, it is believed that chemically combined carbon is first decomposed into free carbon under the reaction conditions and this free carbon is then converted to diamond.

In carrying out the process of the present invention the carbonaceous material and the platinum, each in any desired physical form, are brought into contact and heated at a temperature of 2050° C. to 2500° C. at a pressure of at least 90,000 atmospheres for a sufficient time to allow the conversion of the carbonaceous material to diamond. The time required for the conversion is extremely short, and satisfactory conversions of, for example, graphite to diamond, have been accomplished in times as low as 30 seconds. In general, however, it is preferred to leave the carbonaceous material and the platinum at the reaction pressure and temperature for about 3 minutes to insure good yields of diamond.

The relative amounts of carbonaceous material and platinum may vary within extremely wide limits. In fact, no limit on this ratio has been found. In general, 0.1 to 10 parts by weight of carbonaceous material per part platinum are employed with the preferred ratio being about 0.15 part of carbonaceous material per part of platinum. The form of the carbonaceous material and the platinum are also unimportant. Thus, satisfactory conversions of graphite to diamond have been accomplished employing either or both the carbon and the platinum in powdered form or in solid form with the carbon and platinum being intimately mixed or being only placed adjacent each other.

The pressure employed in the practice of the present invention may also vary within extremely wide limits. The only limitation on this pressure is the minimum value of 90,000 atmospheres. Thus, pressure up to several hundred thousand atmospheres may be employed. However, in the preferred embodiment of my invention the pressure varies from about 90,000 to 115,000 atmospheres. In carrying out the process of the present invention any apparatus capable of producing the pressures required at the temperatures required is satisfactory, since the invention is obviously not dependent upon any particular type of apparatus.

One suitable type of apparatus for carrying out the present invention is the apparatus described and claimed in the applications of H. T. Hall, Serial No. 488,050, filed February 14, 1955, now abandoned, and Serial No. 707,432, filed concurrently herewith, now U.S. Patent No. 2,941,248, issued June 21, 1960 both assigned to the same assignee as the present invention. This apparatus defines a reaction zone of controllable dimensions in which controllable temperatures and pressures may be obtained and maintained for desired periods of time. The disclosure of these Hall applications is hereby incorporated by reference into the present application. The apparatus disclosed in the aforementioned Hall applications is a high pressure device for insertion between the platens of a hydraulic press. The high pressure device consists of an annular member defining a substantially cylindrical reaction area, and two conical piston-type members or punches designed to fit into the substantially cylindrical portion of the annular member from either side of said annular member. A reaction vessel which fits into the annular member may be compressed by the two piston members to reach the pressures required in the practice of the present invention. The temperature required is obtained by any suitable means, such as, for example, by induction heating, by passing an electrical current (either alternating or direct) through the reaction vessel, or by winding heating coils around the reaction vessel.

The drawing illustrates a specific apparatus which has been successfully employed for maintaining the sustained pressures and temperatures required for the practice of the present invention. In Fig. 1 of the drawing a hydraulic press capable of applying a force of 450 tons comprises a base 10 with a press bed 11 on which are mounted a plurality of vertical shafts 12 to support a movable carriage 13 with a hydraulic shaft 14. A pair of opposed recessed pistons 15 and 16 formed of hard steel on bed 11 and carriage 13 are recessed to partially position punch assemblies 17 therein, each of which punch assembly is provided with an electrical connection in the form of an annular cooper conducting ring 18 with a connector 19 to supply electric current from a source of power (not shown) through assemblies 17 to the high temperature-high pressure reaction vessel which is described below. A layer of electrical insulation (laminated phenol-formaldehyde impregnated paper) 20 is provided between lower punch assembly 17 and its associated piston 15 to prevent conduction of electrical current through the press. A lateral pressure resisting assembly or belt 21 is positioned between opposed assemblies 17 to provide a multistaging pressure effect.

Figure 2:
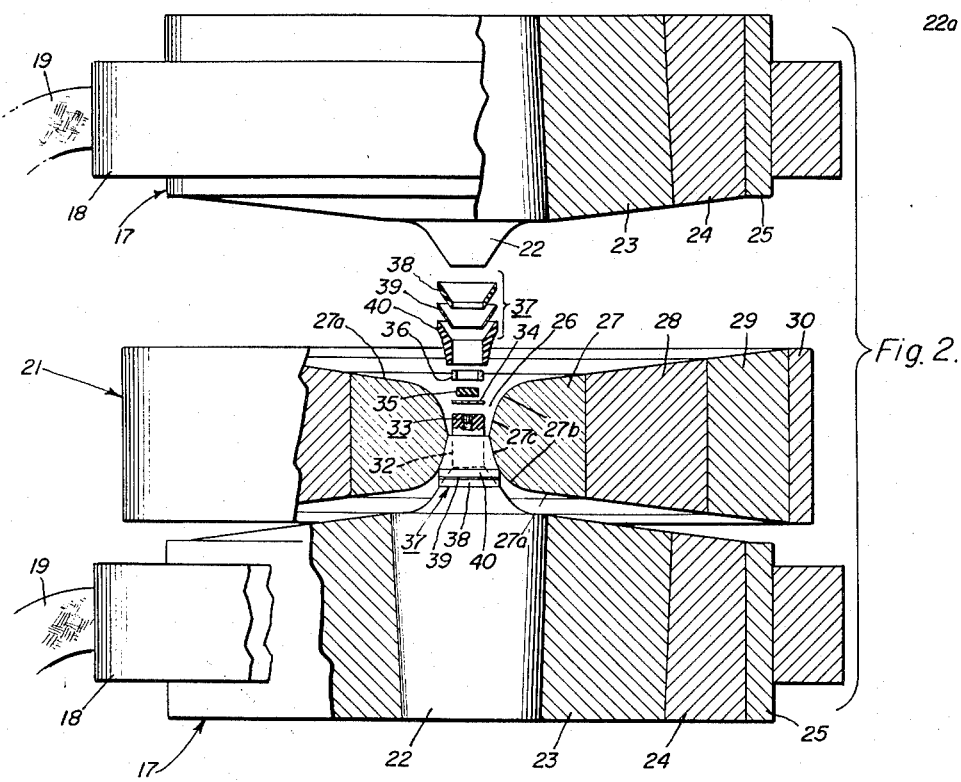
Fig. 2 is an enlarged, exploded sectional view of the high temperature high pressure apparatus of Fig. 1.

In Fig. 2 is shown a partially exploded view, partly in section, of the punch assemblies 17 and the lateral pressure resisting assembly 21 of Fig. 1. To facilitate the practice of the present invention by persons skilled in the art, Fig. 2 is drawn to scale with each element of the drawing proportional to its actual size and shape in the specific apparatus successfully employed. In Fig. 2 the outside diameter of punch assemblies 17 is equal to 6 inches. Each punch assembly 17 comprises a punch 22 with surrounding binding rings 23 and 24 with a soft carbon steel safety ring 25 located around binding ring 24. Punch 22 is formed of Carboloy grade 44A cemented carbide which comprises 94 percent tungsten carbide and 6 percent cobalt. This material is more completely described in the publication "Properties of Carboloy Cemented Carbides," April 2, 1951, issued by Carboloy Department, General Electric Company, Detroit, Michigan. Binding rings 23 and 24 are formed of AISI 4142 alloy steel, commercially available, and comprising, by weight, 0.4 to 0.5 percent carbon, 0.71 to 1 percent manganese, 0.4 percent phosphorus, 0.4 percent sulfur, 0.2 to 0.35 percent silicon, 0.8 to 1.1 percent chromium, and 0.15 to 0.25 percent molybdenum. Binding ring 23 is hardened to 50 Rockwell C and binding ring 24 is hardened to a Rockwell C hardness of 40. It is seen from Fig. 2 that the members of punch assembly 17 are slightly tapered on their sides. This taper is employed so as to provide a force fit so that punch 22 is under high compression in the punch assembly. Assembly of these elements is accomplished by first forcing ring 24 into safety ring 25 in a suitable press and subsequently forcing ring 23 into binding ring 24. Finally punch 22 is forced into ring 23.

Figure 3:
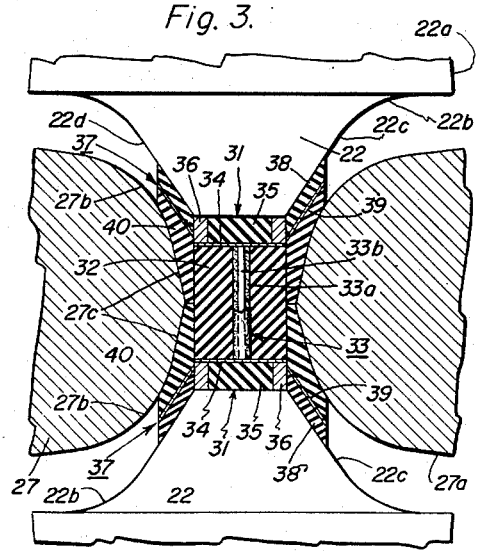
Fig. 3 is an enlarged, sectional view of a portion of the high temperature high pressure apparatus of Fig. 2.

As is best shown in Fig. 3, which is a scale drawing with the faces 31 of punches 22 having a diameter of 0.350 inch, each punch 22 has a generally cylindrical portion 22A having a diameter of about 1.5 inches and a height of about 2.07 inches. Each punch 22a has a tapered portion having a vertical height of about 0.47 inch which comprises a first frustoconical portion 22b at an angle of about 7° from the horizontal, a curved portion 22c, and a second frustoconical portion 22d which has a slant length of about 0.25 inch and extends at an angle of about 30° from the vertical. Binding ring 23 has an outside diameter of about 3.9 inches, binding ring 24 has an outside diameter of about 5.5 inches, and, as previously mentioned, the outside diameter of soft, safety ring 25 is 6 inches. As best seen in Fig. 2 each punch assembly 17 is flat on one side and tapers gently on the opposite side. This taper is about 7° from horizontal.

As best shown in Figs. 1 and 2, lateral pressure resisting assembly 21, which is positioned between opposed punch assemblies 17, tapers inwardly toward the center to provide an aperture 26 in axial alignment with opposed punches 22. Assembly 21 comprises an inner annular ring 27 formed of the aforementioned Carboloy grade 44A cemented carbide and two concentric binding rings 28 and 29 formed of AISI 4142 alloy steel. Rings 28 and 29 have Rockwell C hardnesses of 50 and 40, respectively. A soft carbon steel safety ring 30 surrounds outer binding ring 29. Rings 27, 28 and 29 are slightly tapered at their contact faces so as to provide the force fit arrangement previously described in connection with punch assembly 17. The individual rings of lateral pressure resisting assembly 21 are assembled in the same manner as were the various rings of punch assembly 17.

As is best shown in Fig. 2, inner annular ring 27 has an outside diameter of about 2.4 inches, a maximum height of about 1.2 inches, and a minimum inside diameter of about 0.4 inch. Ring 27, which is substantially symmetrical about a horizontal plane, comprises portions 27a which are tapered at an angle of about 7° from horizontal, curved portions 27b, and tapered portions 27c, which taper at an angle of about 11° from the vertical. Binding ring 28 has an outside diameter of about 4.8 inches, binding ring 29 has an outside diameter of about 6.4 inches, and safety ring 30 has an outside diameter of about 6.9 inches. Lateral pressure resisting assembly 21 tapers gently from the area of ring 30 to the area of ring 27 with the taper being equal to about 7° from the horizontal.

As is best shown in Fig. 3, punches 22 and ring 27 of lateral pressure resisting assembly 21 define a controllable reaction zone in which material to be subjected to elevated pressures and temperatures is positioned. As previously mentioned, Fig. 3 is a scale drawing with the faces 31 of punches 22 having a diameter of 0.350 inch. All elements in Fig. 3 conform to this scale except elements 34 and 39, whose thicknesses have been exaggerated. The specimen to be subjected to high pressure and high temperature is positioned in a hollow cylindrical reaction vessel 32, which in this specific illustration is formed of pyrophyllite. Reaction vessel 32 has a height of about 0.4 inch, an outside diameter of 0.35 inch, and an inside diameter of 0.055 inch. Pyrophyllite has been chosen the material of construction for cylindrical reaction vessel 32 for the reasons, among others, that it is readily machinable to the desired shape and is inert to the reactants under the conditions of reaction employed in the practice of the present invention. The specimen 33 to be subjected to elevated pressures and temperatures is then positioned within the central aperture in reaction vessel 32. In this specific illustration the specimen consists of a hollow spectroscopic graphite cylinder 33a having a height of about 0.4 inch, a wall thickness of 0.0125 inch and an outside diameter of 0.055 inch. Graphite cylinder 33a surrounds a platinum wire 33b about 0.4 inch in height with an outside diameter of 0.030 inch. The reaction vessel 32 is closed or sealed at each end by conducting metal end disks 34 which have a thickness of .020 inch and a diameter of 0.350 inch. Positioned adjacent each disk 34 is a disk 35 of pyrophyllite having a diameter of about 0.250 inch and a thickness of about 0.10 inch. An annular conducting ring 36 of AISI 4142 alloy steel having a Rockwell C hardness of 50 surrounds each of the disks 35. Ring 36 has an outside diameter of 0.350 inch and a thickness of 0.10 inch.

Inside of ring 27 of lateral pressure resisting assembly 21 and surrounding reaction vessel 32 and partially surrounding the tapered portion of each punch 22 are gasket assemblies 37, each of which comprises an inner conical pyrophyllite washer 38 having a thickness of 0.030 inch, a slant height of approximately 0.25 inch, and making an angle of 30° with the vertical. Washer 38 is surrounded by a soft carbon steel conical washer 39 having a thickness of approximately 0.010 inch and a slant height of about 0.25 inch and an angle of about 30° with respect to the vertical. Each of washers 40 has an inside diameter at its narrowest portion of 0.35 inch and an outside diameter at its narrowest portion of 0.40 inch. The 0.35 inch inner cylindrical surface of washer 40 has height of about 0.2 inch. Washer 40 also has a tapered conical interior portion designed to cooperate with the outer surface of washer 39 and which has a taper with respect to the vertical of about 30°. The overall vertical height of washer 40 is approximately 0.43 inch and the outer surface of washer 40 is designed to conform to the shape of that portion of ring 27 with which washer 40 comes into contact.

In the operation of the high pressure-high temperature apparatus of the drawing to produce the pressures and temperatures required in the practice of the present invention, opposed recessed pistons 15 and 16 are attached respectively to press bed 11 and carriage 13 by any suitable means (not shown). Insulation layer 20 is then placed in the recess in piston 15 and lower punch assembly 17 is positioned in the recess in piston 15 on top of insulation layer 20. Upper punch assembly 17 is then fastened into the recess in upper recessed piston 16 by suitable means (not shown). Lower gasket assembly 37 is then positioned over lower punch 22, lower insulating disk 35 and conducting ring 36 are then positioned within lower gasket assembly 37 and conducting disk 34 is put in place. Lateral pressure resisting assembly 21 is then positioned around the parts previously assembled. Cylindrical reaction vessel 32, which contains graphite tube 33a and platinum wire 33b is then added to the assembly. Subsequently, upper conducting disk 34, upper insulating disk 35 and upper conducting ring 36 are put into place. The final operation is the positioning and assembly of upper gasket assembly 37.

Reaction vessel 32 is subjected to the pressures required in the practice of the present invention by applying force to the high pressure-high temperature apparatus by means of shaft 14 of the press. The method of correlating the press load required to produce a given pressure within reaction vessel 33 is discussed below. After the desired pressure is reached the reaction vessel is brought to the desired temperature by electrical resistance heating of the contents of reaction vessel 33. Specifically, electrical current is supplied from one electrical connector, such as upper connector 19 to upper conducting ring 18, upper rings 25, 24, 23, upper punch 22, upper ring 36, upper disk 34, and to graphite tube 33a and platinum wire 33b. The electrical path from the bottom of tube 33 to lower connector 19 is similar to the conducting path described above. After the reaction vessel has been held at the desired pressure and temperature for the desired time, the electrical current to the reaction vessel is cut off and the pressure is released. Diamonds which have been formed are then removed from the reaction vessel.

In preparing diamond by the method of the present invention it is difficult to measure the pressure and temperature to which the reactants are subjected by direct means because of the extreme pressure employed. Therefore, each of these conditions is measured by indirect means. In measuring the pressure, recognition is made of the fact that certain metals undergo distinct changes in electrical resistance at particular pressures. Thus, bismuth undergoes a phase change which results in a change in electrical resistance at 24,800 atmospheres, thallium undergoes such a phase change at 43,500 atmospheres, cesium undergoes such a change at 53,500 atmospheres, and barium undergoes such a change at 77,400 atmospheres. It has been found that the melting point of germanium varies directly with pressure over an extremely wide pressure range, including pressures up to and above 110,000 atmospheres and it is known that the electrical conductivity (and resistance) of germanium undergoes a marked change in the transition of germanium from the liquid to the solid phase. Thus, by determining the hydraulic press load necessary to cause a phase change in a metal such as bismuth a point on a pressure-press load curve is determined. By filling a reaction vessel in the Hall apparatus with germanium and applying the same press load employed to obtain the phase change in bismuth, and by then heating the germanium to the temperature at which the germanium melts (as measured by a large decrease in electrical resistivity) a point on a pressure-melting point curve for germanium is determined. By carrying this same operation out with other metals such as thallium, cesium and barium, whose phase change points are known, a series of points on a melting point-pressure curve for germanium are obtained. It has been found that this melting point-pressure curve is a straight line. Therefore, by applying other press loads with the hydraulic press apparatus while the reaction chamber is filled with germanium and determining the melting point of the germanium at the different press loads, the actual pressure in the chamber at a given press load is determined. The phase changes recited for the above metals were the standards for determining the pressures employed in the practice of my invention and are the basis for the pressures recited in the appended claims.

The temperature in the reaction vessel is determined by fairly conventional means such as by placing a thermocouple junction in the reaction vessel and measuring the temperature of the junction in the usual manner. One suitable method of positioning a thermocouple in the apparatus for the measurement of temperature is to run a pair of thermocouple wires between outer pyrophyllite gasket 40 and lateral pressure resisting assembly 21. These wires then pass through the joint between upper and lower gasket assemblies 37 and through holes drilled in reaction vessel 32 and graphite cylinder 33a. After adding platinum wire 33b, the apparatus is assembled and subjected to a high pressure, such as a pressure of 2,000 to 100,000 atmospheres. Electrical energy at a predetermined rate is then supplied the apparatus and the temperature produced by this power is measured by the thermocouple assembly. This same procedure is repeated a number of times with different power inputs to produce a calibration curve of power input versus temperature in the reaction vessel. After calibration of the apparatus by this method, the temperature of the contents of the reaction vessel is determined by the power input to the apparatus in conjunction with the calibration curve. In general, to produce a temperature of about 2300° C. at 100,000 atmospheres in the apparatus specifically illustrated, an alternating current voltage of from about 2 volts at a current up to about 200 amperes is used to deliver the required 400 watts through the contents of reaction vessel 32.

The temperature of the reaction chamber may also be determined by measuring the resistance of heating coils, such as platinum heating coils, wound around the reaction chamber. The temperature of platinum is determined from its well known temperature coefficient of resistance. Thus, the temperature within the reaction vessel is determined by relatively simple means and the pressure within the vessel is read from a plot of the relationship between the force applied by the platens of the press to the pressure within the reaction vessel.

The following examples are illustrative of the practice of my invention and are not intended for purposes of limitation. In all of the examples the specific high temperature high pressure apparatus described in Figs. 1 to 3 was employed. In all of the examples the pressure on the reaction vessel was uniform. The temperatures referred to in the examples are the temperatures at those portions of the interface of the platinum wire 33b and the carbon cylinder 33a at which diamonds were formed. Temperatures at other parts of the interface vary considerably from the listed values.

In all of the examples, the reaction products were treated with fuming red nitric acid, which had the effect of dissolving all of the materials in the product except diamond. Where diamond was formed in the examples, the diamond was examined by at least one of the following methods to make sure that the product formed was actually diamond: X-ray crystallography, refractive index, density, chemical analysis, infrared analysis, and hardness tests.

The table below lists for each example the pressure and temperature employed, the time at which the reaction vessel was subjected to this pressure and temperature, and the results of the example.

| Example | Pressure (Atmospheres) | Temperature (° C.) | Time (Min.) | Results |
|---|---|---|---|---|
| 1 | 90,000 | 2,050 | 3 | Diamonds Formed. |
| 2 | 90,000 | 2,500 | 3 | Do. |
| 3 | 97,000 | 2,050 | 4 | Do. |
| 4 | 97,000 | 2,500 | 6 | Do. |
| 5 | 100,000 | 2,150 | 2 | Do. |
| 6 | 100,000 | 2,400 | 2 | Do. |
| 7 | 110,000 | 2,150 | 3 | Do. |
| 8 | 110,000 | 2,400 | 3 | Do. |
| 9 | 115,000 | 2,400 | 3 | Do. |
| 10 | 85,000 | 2,400 | 3 | No Diamonds Formed. |
| 11 | 100,000 | 2,000 | 3 | Do. |
| 12 | 95,000 | 2,700 | 3 | Do. |

As shown by Example 10 when a temperature within the range of 2050° C. to 2500° C. is employed but with a pressure below the minimum pressure of 90,000 atmospheres, no diamonds are formed. Similarly, as shown by Example 11, with a pressure of 100,000 atmospheres but with a temperature of 2000° C., which is below the minimum temperature of 2050° C., diamonds are not formed. Similarly, Example 12 shows that when a temperature of above 2500° C. is employed, no diamonds are formed.

The products of Example 5 were examined by X-ray crystallographic methods to further corroborate the fact that diamonds had been formed. Specifically X-ray diffraction patterns were obtained from the diamonds prepared in this example by taking a Debye-Scherrer photograph in a cylindrical camera of 5 cm. radius with a CuK$_\alpha$ radiation. This photograph showed overwhelmingly that diamonds had been formed. The interplanar spacings ($d$ in Angstrom units) measured from these photographs are compared with the theoretical values for diamonds in the table below.

*Interplanar spacing (d in Angstrom units)*

| Plane | Measured | Natural Diamond |
|---|---|---|
| 110 | 2.06 | 2.060 |
| 220 | 1.26 | 1.262 |
| 311 | 1.075 | 1.076 |
| 400 | .89 | 0.8920 |

Since diamonds prepared by the method of the present invention are indistinguishable from natural diamonds, they have the same utility as natural diamonds, e.g., as gems for use in jewelry and other ornamental articles, as the cutting edge of a glass cutter, as the abrasive ingredient in abrasive wheel formulations, etc.

What I claim as new and desired to secure by Letters Patent of the United States is:

1. The method of synthetically making diamonds which comprises (1) combining a carbonaceous material with platinum as the catalyst, (2) subjecting the aforesaid carbonaceous material and catalyst in the diamond forming region to a pressure of at least about 90,000 atmospheres at a temperature from about 2050° C. to 2500° C., and (3) isolating the formed diamond.

2. The method of claim 1 in which the carbonaceous material is graphite.

3. The method of synthetically making diamonds which comprises (1) combining a carbonaceous material with platinum as the catalyst, (2) subjecting the carbonaceous material in the diamond forming region to a pressure of from about 90,000 atmospheres to 115,000 atmospheres at a temperature of from about 2050° C. to 2500° C., and (3) isolating the formed diamond.

4. The method of claim 3 in which the carbonaceous material is graphite.

References Cited in the file of this patent

FOREIGN PATENTS 377,239      Great Britain _____ July 21, 1932

OTHER REFERENCES

Kuss: "Chemie Ingenieur Technik," vol. 28, No. 3, pp. 141–152, March 1956.

Liander: "A.S.E.A. Journal," vol. 28, pp. 97, 98, May-June 1955.

Peiser et al.: "X-Ray Diffraction by Polycrystalline Materials," pp. 500–501 (1955), The Institute of Physics, London.

Henry et al.: "The Interpretation of X-Ray Diffraction Photographs," pp. 219, 221 (1951), MacMillan & Co. Ltd., St. Martins St., London.

Parsons: "Phil. Trans. of the Royal Society," Series A, pp. 67–77, 92–101 (1919).

Gunther et al.: "Z. Anorg. Allgem. Chem.," vol. 250, pp. 357–372 (1943).

Bridgman: "J. of Chem. Physics," vol. 15, No. 2, pp. 92–98, February 1947.

D. P. Mellor: "Research," vol. 2, No. 7, pp. 314–318, July 1949.

Henry, Washington, D.C. "Evening Star," p. A–3, Feb. 15, 1955.

Neuhaus: "Angew. Chem.," vol. 66, pp. 525–536, Sept. 7, 1954.

Azdroff et al.: "The Powder Method," page 1 (1958), McGraw-Hill Book Co. N.Y.C., N.Y.